Aug. 19, 1958 — R. G. STACY — 2,848,072
ENCLOSED DUAL-DISK BRAKES FOR VEHICLES
Filed May 15, 1956 — 4 Sheets-Sheet 1

INVENTOR
Robert G. Stacy
BY Wm. R. Glisson
ATTORNEY

Aug. 19, 1958 R. G. STACY 2,848,072
ENCLOSED DUAL-DISK BRAKES FOR VEHICLES
Filed May 15, 1956 4 Sheets-Sheet 2

INVENTOR
Robert G. Stacy
BY
Wm. R. Glisson
ATTORNEY

Aug. 19, 1958  R. G. STACY  2,848,072
ENCLOSED DUAL-DISK BRAKES FOR VEHICLES
Filed May 15, 1956  4 Sheets-Sheet 3

INVENTOR
Robert G. Stacy
BY Wm. R. Glisson
ATTORNEY

Aug. 19, 1958　　　　R. G. STACY　　　　2,848,072
ENCLOSED DUAL-DISK BRAKES FOR VEHICLES
Filed May 15, 1956　　　　　　　　　　　　4 Sheets-Sheet 4
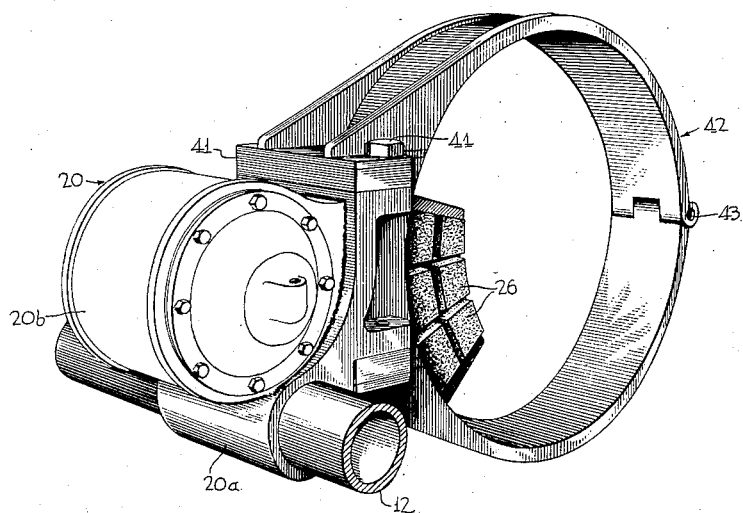
FIG. 7
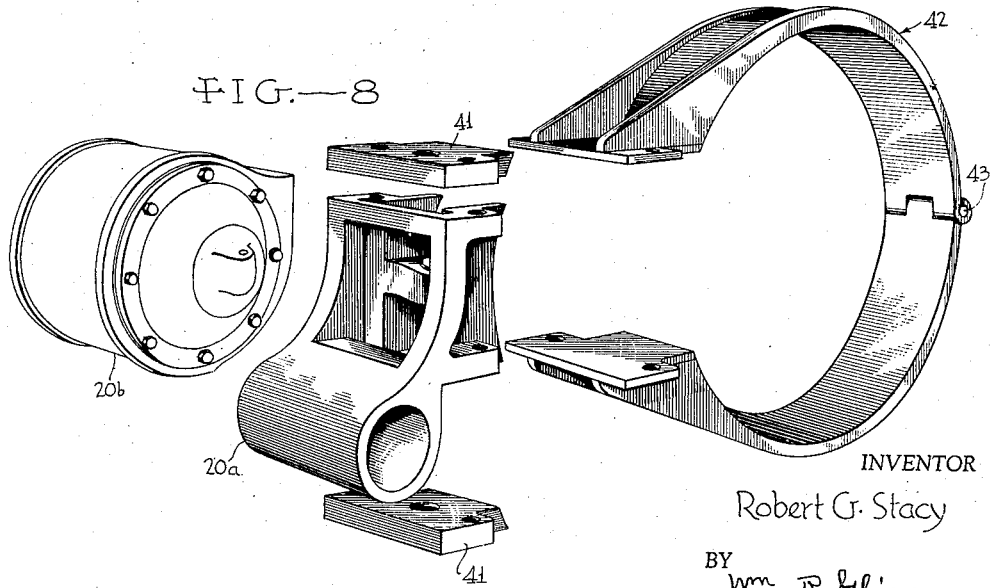
FIG.—8
INVENTOR
Robert G. Stacy
BY Wm. R. Glisson
ATTORNEY United States Patent Office 2,848,072
Patented Aug. 19, 1958

2,848,072

ENCLOSED DUAL-DISK BRAKES FOR VEHICLES

Robert G. Stacy, Jenkintown, Pa., assignor to The Budd Company, Philadelphia, Pa., a corporation of Pennsylvania Application May 15, 1956, Serial No. 584,973

8 Claims. (Cl. 188—59)

This invention relates to enclosed dual-disk brakes for vehicles and has for an object the provision of improvements in this art.

One of the particular objects is to provide outside mounted operator tong-type segmental disk brakes in which the braking surfaces are fully enclosed to exclude water and snow and which will still have adequate outside exposed cooling surface.

Another object is to provide an enclosure which is mounted on the brake operating unit carried by the vehicle truck and which fully encloses the space between two axially spaced brake disks mounted on the wheel axle.

Another object is to provide an enclosure of the character described which can be quickly opened or removed for brake access.

Another object is to provide a brake tong assembly in which the tongs for the opposed brake heads are carried on a single pivot axis and in which the connections of the tongs with the brake heads are located in the same annular axial zone but circumferentially spaced apart so as to occupy a very small axial space between disks.

Another object is to provide a disk brake assembly in which the cover retains the tong pivot pin against removal.

The above and other objects and advantages of the invention will be apparent from the following description of an exemplary embodiment wherein:

Fig. 7 is a perspective view of the brake operating assembly and cover alone; and Fig. 8 is a view similar to Fig. 7 but with the parts of the assembly separated from each other, as during assembly, and with some parts omitted.

Figures 1, 2:
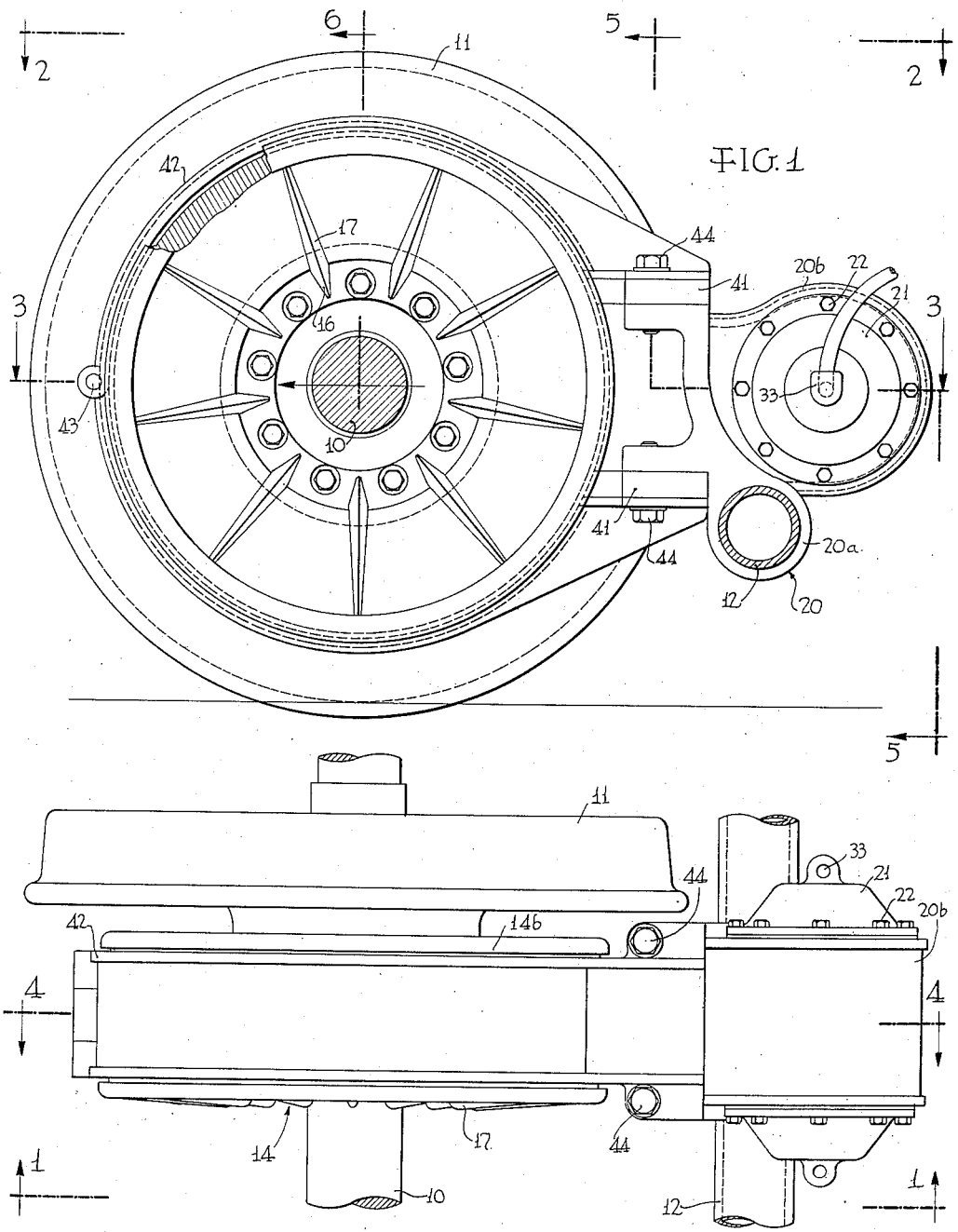
Fig. 1 is a longitudinal vertical elevation and section taken on the line 1—1 of Figs. 2 and 3.
Fig. 2 is a top plan view taken on the line 2—2 of Fig. 1.

The truck of the vehicle is not illustrated but it is understood to be of the well known type in which a truck frame mounted axle 10 carries spaced wheels 11, one of which is shown, and in which a side frame supported transverse brake beam 12 carries two brake operating assemblies or units 13, one of which is shown.

Adjacent the wheel there is mounted a brake disk unit 14 comprising axially spaced disks 14a, 14b and an interior hollow hub portion 14c on which the disks are secured. The disk unit may be made in separate parts or as an integral casting as shown. The hub portion is provided with a radial flange 14d which is secured to the wheel hub, as by cap screws 15.

The disks and hub are rigidified by ribs 16, 17 and 18 which also assist in cooling the disks.

The brake operating unit 13 includes a hollow support 20 (welded together as indicated) which is rigidly secured to the brake beam 12, as by welding, power heads 21 secured over openings in the hollow support by cap screws 22, tong levers 23 mounted on a common pivot pin 24, and brake shoe heads 25 carrying non-metallic composition friction lining pads 26 which engage the friction surfaces of the disks 14a, 14b.

A flexible diaphragm 30 is secured within each cupped head 21 and carries a connecting rod 31 which is connected with a tong lever by a pivot pin 32. Ports 33 are provided in the heads for operating fluid (air, vacuum or liquid) to move the diaphragms inward to apply the brakes. A spring 34 acting against the diaphragm and against a fixed dished inner support plate 35 returns the brakes to off position.

Figure 3:
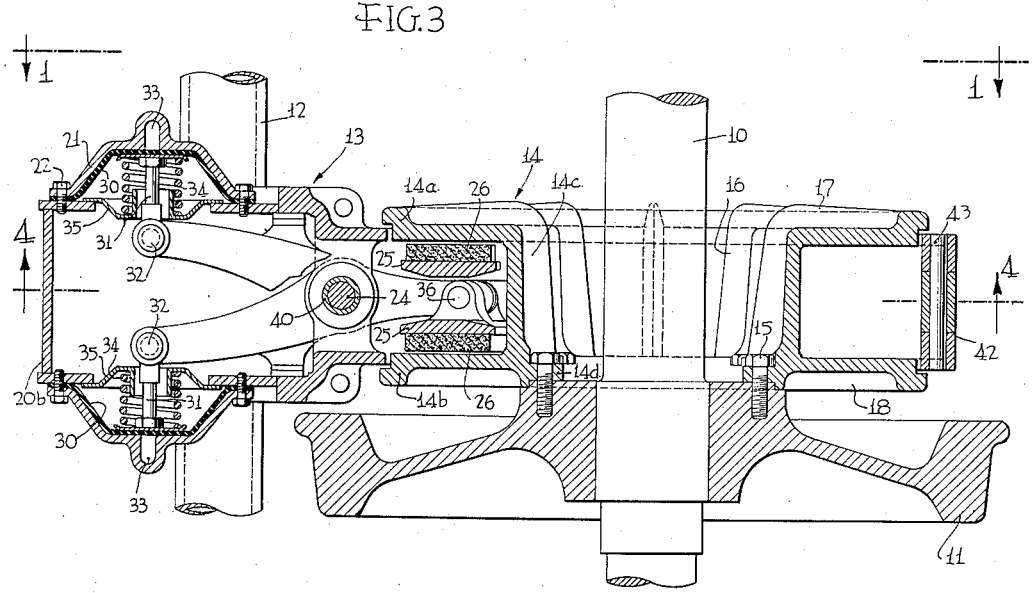
Fig. 3 is a horizontal section taken on the line 3—3 of Figs. 1 and 4.
Figure 4:
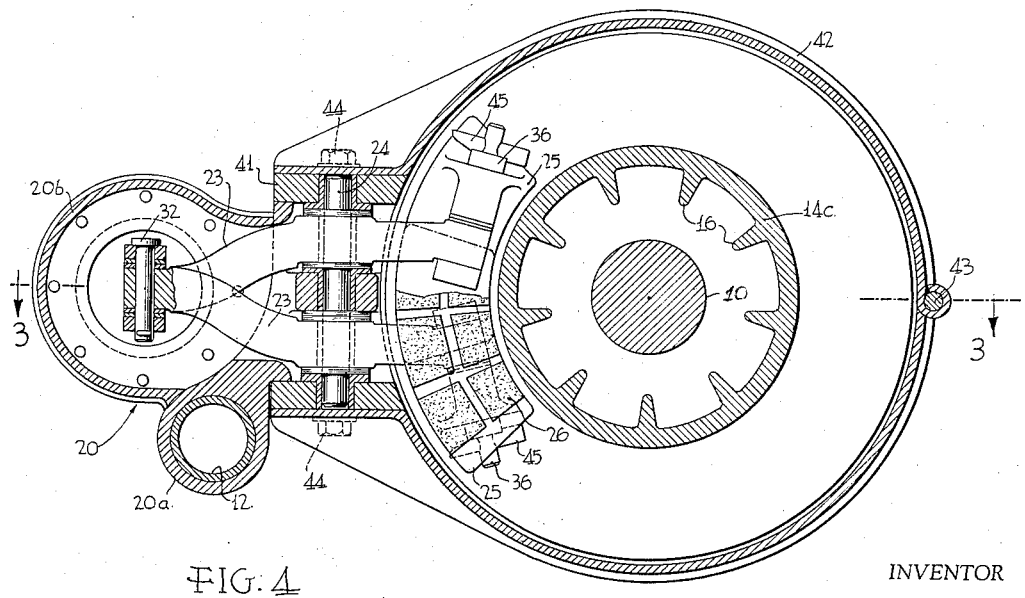
Fig. 4 is a longitudinal vertical section taken on the line 4—4 of Figs. 2 and 3.
Figure 5:
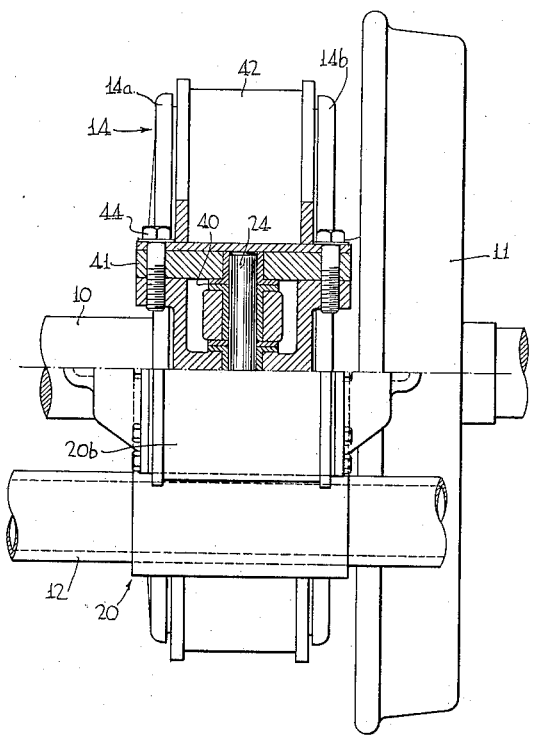
Fig. 5 is a transverse elevation and section taken on the line 5—5 of Fig. 1.
Figure 6:
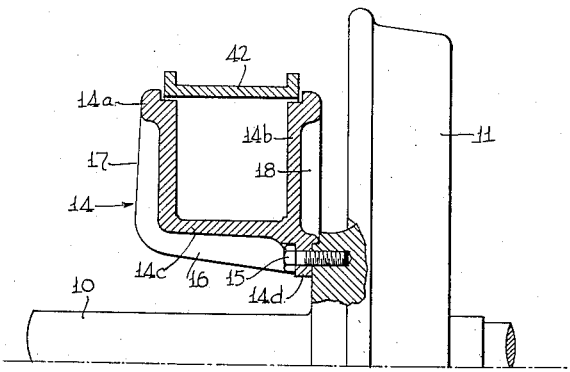
Fig. 6 is a partial transverse vertical section taken on the line 6—6 of Fig. 1.

As best shown in Fig. 4, the brake tong levers 23 diverge vertically from the power-actuated outer ends toward their pivot portions on the pin or journal 24 and their other ends are pivoted to the brake shoe heads 25 by pivot pins 36. As shown in Figs. 3 and 4, these shoe head pivot connections lie in a common annular zone but are spaced apart circumferentially so they do not interfere with each other in action. This permits the disks 14a, 14b to be positioned fairly close together axially.

As shown in Fig. 4, the lining is in small segments or pads spaced apart both radially and axially. The lining segments may, if desired, be resiliently backed and be mounted on removable shoes in accordance with common known practice.

Flanged bushings 40 may be provided at the bearings for the tong pivot pin 24, the outer end bushings being carried by removable plates 41.

A cover 42 encloses the space between disks 14a and 14b and has a sealed turning fit with the peripheries of the disks, either by a simple labyrinth seal as shown, by a more elaborate labyrinth seal, or by a packing joint seal, or both, in known manner. The spacing from the disks or the flexibility of the cover and related parts, or both, take care of any relative movement between disks and cover due to road weave.

The cover is made in two parts hinged together by a pivot pin 43 and each part at its other end is secured to the support 20, together with a plate 41, by cap screws 44.

In Fig. 4 it may be seen that one brake head is secured on its tong pin 36 by a drive pin 45 which is located at the upper end of the pin and the other head is secured by a drive pin which is located at the lower end of the tong pin. The first shoe head may be removed upwardly by removing the screws 44 and swinging up the upper part of the cover; and the second shoe head may be removed downwardly by similarly unfastening and hinging down the lower part of the cover.

Fig. 8 shows the parts as they are being assembled before the barrel-shaped part 20b has been welded to the base part 20a of the hollow support and before the base part 20a has been welded to the hollow brake beam 12. The parts are very readily separated. By taking off the cover, taking off the brake shoe heads and pins 36, driving out the tong lever pivot pin 24, and then removing the power heads 21, the whole of the brake operating mechanism may be removed. By simply removing the covers the wheel-axle unit may be dropped.

There is very large cooling surface which is effectively cooled by air which is forced to circulate over it by the ribs of the rotating disks acting as centrifugal blowers. The inner braking surfaces are fully protected from water and snow and the brakes will function uniformly well under all weather conditions.

It is thus seen that the invention provides a simple inexpensive brake assembly which is efficient under all conditions of operation.

While one embodiment of the invention has been disclosed by way of illustration it is to be understood that there may be various embodiments within the scope of the invention.

What is claimed is:

1. A disk brake assembly for rail vehicles comprising in combination, a pair of axially spaced rotatable brake disks having axially spaced braking surfaces facing each other, a brake shoe operating assembly mounted in a fixed position radially outside the disks, said operating assembly including a casing and hinged tong levers carried thereby having their ends entered in the space between the braking surfaces, brake shoes pivoted to the tong levers in position to engage said braking surfaces, means on the operating assembly for actuating said levers to move their outer ends to operate the brake shoes, and a cover carried by said operating assembly casing which, together with the casing, fully encloses the disks and the space between them to exclude water, snow and the like from the braking surfaces and brake shoes.

2. A disk brake assembly for rail vehicles comprising in combination, a pair of axially spaced rotatable brake disks having axially spaced braking surfaces facing each other, a brake shoe operating assembly mounted in a fixed position radially outside the disks, said operating assembly including a casing and hinged tong levers carried thereby having their ends entered in the space between the braking surfaces, brake shoes pivoted to the tong levers in position to engage said braking surfaces, means on the operating assembly for actuating said levers carried thereby, and a cover carried by said operating assembly casing which, together with the casing, fully encloses the disks and the space between them to exclude water, snow and the like from the braking surfaces and brake shoes, said cover having a turning sealing fit with the peripheries of said disks.

3. A disk brake assembly for rail vehicles comprising in combination, a pair of axially spaced rotatable brake disks having axially spaced braking surfaces facing each other, a brake shoe operating assembly mounted in a fixed position radially outside the disks, said operating assembly including a casing and hinged tong levers carried thereby having their ends entered in the space between the braking surfaces, brake shoes pivoted to the tong levers in position to engage said braking surfaces, means on the operating assembly for actuating said levers to move their outer ends to operate the brake shoes, and a cover carried by said operating assembly casing which, together with the casing, fully encloses the disks and the space between them to exclude water, snow and the like from the braking surfaces and brake shoes, the tong levers for opposed shoes having their shoe-connected ends divergent and connected to brake shoe heads in a common annular zone but spaced apart circumferentially.

4. A disk brake assembly for rail vehicles comprising in combination, a pair of axially spaced rotatable brake disks having axially spaced braking surfaces facing each other, a brake shoe operating assembly mounted in a fixed position radially outside the disks, said operating assembly including a casing and hinged tong levers carried thereby having their ends entered in the space between the braking surfaces, brake shoes pivoted to the tong levers in position to engage said braking surfaces, means on the operating assembly for actuating said levers to move their outer ends to operate the brake shoes, and a cover carried by said operating assembly casing which, together with the casing, fully encloses the disks and the space between them to exclude water, snow and the like from the braking surfaces and brake shoes, said cover being formed in two transversely divided circumferential segments connected together at one division point and secured at their free ends to the casing of the operating assembly.

5. A disk brake assembly for rail vehicles comprising in combination, a pair of axially spaced rotatable brake disks having axially spaced braking surfaces facing each other, a brake shoe operating assembly mounted in a fixed position radially outside the disks, said operating assembly including a casing and hinged tong levers carried thereby having their ends entered in the space between the braking surfaces, brake shoes pivoted to the tong levers in position to engage said braking surfaces, means on the operating assembly for actuating said levers to move their outer ends to operate the brake shoes, and a cover carried by said operating assembly casing which, together with the casing, fully encloses the disks and the space between them to exclude water, snow and the like from the braking surfaces and brake shoes, said cover being formed in two transversely divided circumferential segments hinged together at one division point and removably secured at their free ends to the casing of the operating assembly.

6. A disk brake assembly for rail vehicles comprising in combination, a pair of axially spaced rotatable brake disks having axially spaced braking surfaces facing each other, a brake shoe operating assembly mounted in a fixed position radially outside the disks, said operating assembly including a casing and hinged tong levers carried thereby having their ends entered in the space between the braking surfaces, brake shoes pivoted to the tong levers in position to engage said braking surfaces, means on the operating assembly for actuating said levers to move their outer ends to operate the brake shoes, and a cover carried by said operating assembly casing which, together with the casing, fully encloses the disks and the space between them to exclude water, snow and the like from the braking surfaces and brake shoes, said tong levers for opposed shoes being circumferentially divergent and secured to brake shoe heads by removable pivot pins in spaced circumferential positions and removable in opposite circumferential directions, and said cover being transversely divided into two circumferential segments hinged together at one division point and removably secured at the free ends to the casing of the operating assembly, whereby one cover portion may be hinged out to remove one brake shoe and the other cover portion may be hinged out to remove the other brake shoe.

7. A disk brake assembly for rail vehicles comprising in combination, a pair of axially spaced rotatable brake disks having axially spaced braking surfaces facing each other, axially spaced opposed brake shoes having brake lining for engaging said braking surfaces, axially and circumferentially divergent tong lever arms pivoted to said respective shoes at circumferentially spaced points, said levers being pivoted on a common fulcrum or hinge axis, and operating means located radially outside said brake disks connected to said levers in a common plane passing through the axis of the disks and cutting across the fulcrum axis of the levers between the pivots of the levers to the brake shoes.

8. A disk brake assembly for rail vehicles comprising in combination, a pair of axially spaced rotatable brake disks having axially spaced braking surfaces facing each other, axially spaced opposed brake shoes having brake lining for engaging said braking surfaces, axially and circumferentially divergent tong lever arms pivoted to said respective shoes at circumferentially spaced points, said tong levers being pivoted on a common operating axis, and their brake-head connected ends being disposed in a common annular zone whereby the space between disks may be made small, and operating means located radially outside said brake disks connected to said levers in a common plane passing through the axis of the disks and cutting across the fulcrum axis of the levers between the pivots of the levers and the brake shoes.

References Cited in the file of this patent

UNITED STATES PATENTS

| | | |
|---|---|---|
| 1,900,282 | Halbach | Mar. 7, 1933 |
| 2,174,398 | Farmer | Sept. 26, 1939 |
| 2,174,400 | McCune | Sept. 26, 1939 |
| 2,180,092 | Oelkers | Nov. 14, 1939 |
| 2,479,085 | Schrage | Aug. 16, 1949 |